June 16, 1925.
E. C. BOECHER
TRANSFORMER HOUSING AND MOUNTING MEANS
Filed June 22, 1921
1,542,600
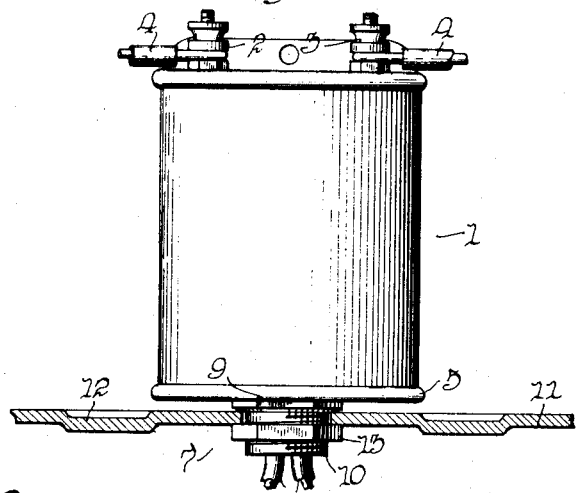
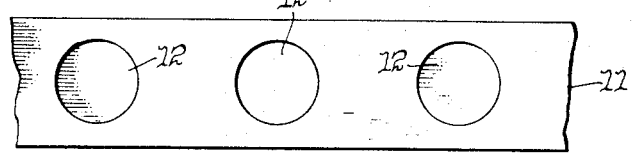
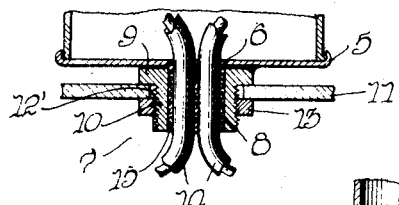
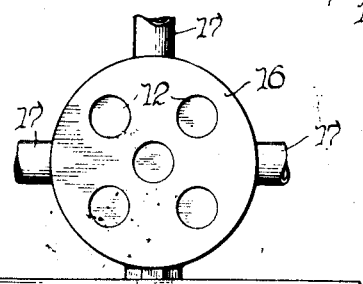
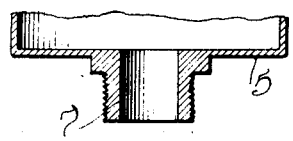
Inventor
Edward C. Boecher
By Brown, Boettcher & Dienner
Attorneys Patented June 16, 1925.

1,542,600

UNITED STATES PATENT OFFICE

EDWARD C. BOECHER, OF CHICAGO, ILLINOIS.

TRANSFORMER HOUSING AND MOUNTING MEANS.

Application filed June 22, 1921. Serial No. 479,459.

*To all whom it may concern:*

Be it known that I, EDWARD C. BOECHER, a citizen of the United States, residing at Chicago, in the county of Cook and State of Illinois, have invented a certain new and useful Improvement in Transformer Housing and Mounting Means, of which the following is a full, clear, concise, and exact description, reference being had to the accompanying drawings, forming a part of this specification.

My invention relates to an improved transformer housing and mounting means therefor.

The invention finds peculiar novelty when adapted to employment in transformers of the smaller type, usually used with apparatus requiring low voltage, but it is to be understood that the invention is also valuable for electric apparatus of any kind where particular care is required in leading the conductors from the apparatus, and a substantial and direct mounting is desirable.

Usually lead wires are led from the transformer casing through individual insulation bushings, which prevent a direct mounting of the transformer on the conduit box. The conduit box is generally provided with "punch outs," which are removed by slight tapping, in order to allow the lead wires to enter. Employing the openings where the "punch outs" have been, as means for obtaining a direct and suitable mounting for apparatus used in connection with the box, has never been heretofore considered of much value.

It is the aim of the present invention to mount the transformer directly upon the box. In order to accomplish this successfully, a coupling consistent with the requirements of protecting the lead wires has resulted. This coupling is in form of a flush nipple, threaded exteriorly and provided at one end with a flange. The threaded shank projects into the opening and receives a nut on the inside to clamp securely the transformer to the box.

I am aware of the fact that the use of flush nipples is well known, especially in pipe construction. But in the present instance, it has a particular utility in that it not only provides a support for the transformer but permits the lead wires to be led out of the transformer in a novel and simplified manner, which has considerably reduced the cost of manufacturing the device.

In the drawings:

Figure 1 is an elevational view of the transformer, illustrating it attached to a wall of the conduit box;

Figure 2 is a top plan view of the conduit box wall, illustrating a plurality of "knockouts" provided therein;

Figure 3 is a detail sectional view of the coupling;

Figure 4 is a view showing my invention as coupling two conduit boxes together, and Figure 5 is a detail sectional view, illustrating the nipple formed integral with the transformer base.

I shall describe my invention particularly as adapted to mount devices like transformers on what in the trade is commonly called "knock-out" boxes, or conduit boxes.

In Figure 1, the transformer 1 is of the usual type and is provided with the terminals 2 and 3 to which are attached the distribution wires 4. The base 5 of the transformer 1 is formed with an aperture 6, which permits the conductors 14 to be led out of the transformer.

A nipple 7 is provided and preferably secured in fixed relation to the base 5, so that the passage 8 of the nipple will register with the aperture 6. The nipple 7 is formed with an integral flange or shoulder 9 at its upper end and with an exteriorly threaded shank 10. The preferred manner of securing the nipple to the base 5 is to solder the flange 9 directly to the base, but, of course, other ways of securing this nipple will serve fully as well.

The conduit box 11, as is well known, is provided with a plurality of partially stamped-out discs 12, which may be removed by slight tapping.

I propose passing the threaded shank 10 through the opening 12' formed by knocking out one of the discs 12, and to lock the shank 10 therein by the use of a nut 13. Here too, an arrangement other than that shown may be used without departing from the invention. The conductors are taken out of the transformer by way of the opening 6 of the transformer, the leads 14 being held in rigid position in this opening 8 by means of any suitable sealing wax 15. The sealing wax has a twofold advantage in that it not only holds the conductors in proper position but prevents them from coming in direct contact with each other, and also excludes moisture from the transformer housing.

The gist of the invention is to form the nipple 7, which will properly hold the transformer in position, while at the same time serve as means for leading the conductors from the transformer to the conduit box.

The invention may find utility in other arrangements such as is shown in Figure 4. The circular conduit box 16, to which the conduit pipes 17 are attached, is likewise provided with punch-out discs 12 about its periphery and in its faces. The pipes 17 lead into the conduit box where the discs 12 in the periphery have been removed. Many times it is desirable to secure the conduit box directly to apparatus such as switch boxes 18. In this instance, the relation of nipple 7 to the two devices is the same.

To one skilled in the art, it will be apparent that there are many ways to secure the nipple 7 to the transformer. Of these, I have shown the nipple 7 as formed integral with the transformer base 5, and the base 5 as formed integral with the shell, for which any suitable construction may be provided to permit removal.

From the foregoing it is evident that my device has great utility as a coupling for securing transformers to conduit boxes, and possesses certain advantages, as such, to an extent that it may be adapted to arrangements other than shown.

I claim:

1. As a new article of manufacture, a transformer including a metallic sealed casing having a metallic nipple of a standard size rigidly secured thereto and provided with means whereby it may be secured in a similar standard opening in a metallic electrical apparatus housing and insulated conductors connected to a winding in the casing and extending therefrom through the nipple.

2. As an article of manufacture, a bell ringing transformer including a metallic sealed casing provided with an apertured part having a thread of standard size for cooperation with a standard threaded member for securing the casing to a metallic housing, and insulated conductors connected to a winding in the casing and extending therefrom through the aforesaid apertured part.

In witness whereof I hereunto subscribe my name this 16th day of June 1921.

EDWARD C. BOECHER.